Nov. 10, 1953  I. JEPSON  2,658,597
CAM RELEASED CLUTCH
Filed May 11, 1948  2 Sheets-Sheet 1
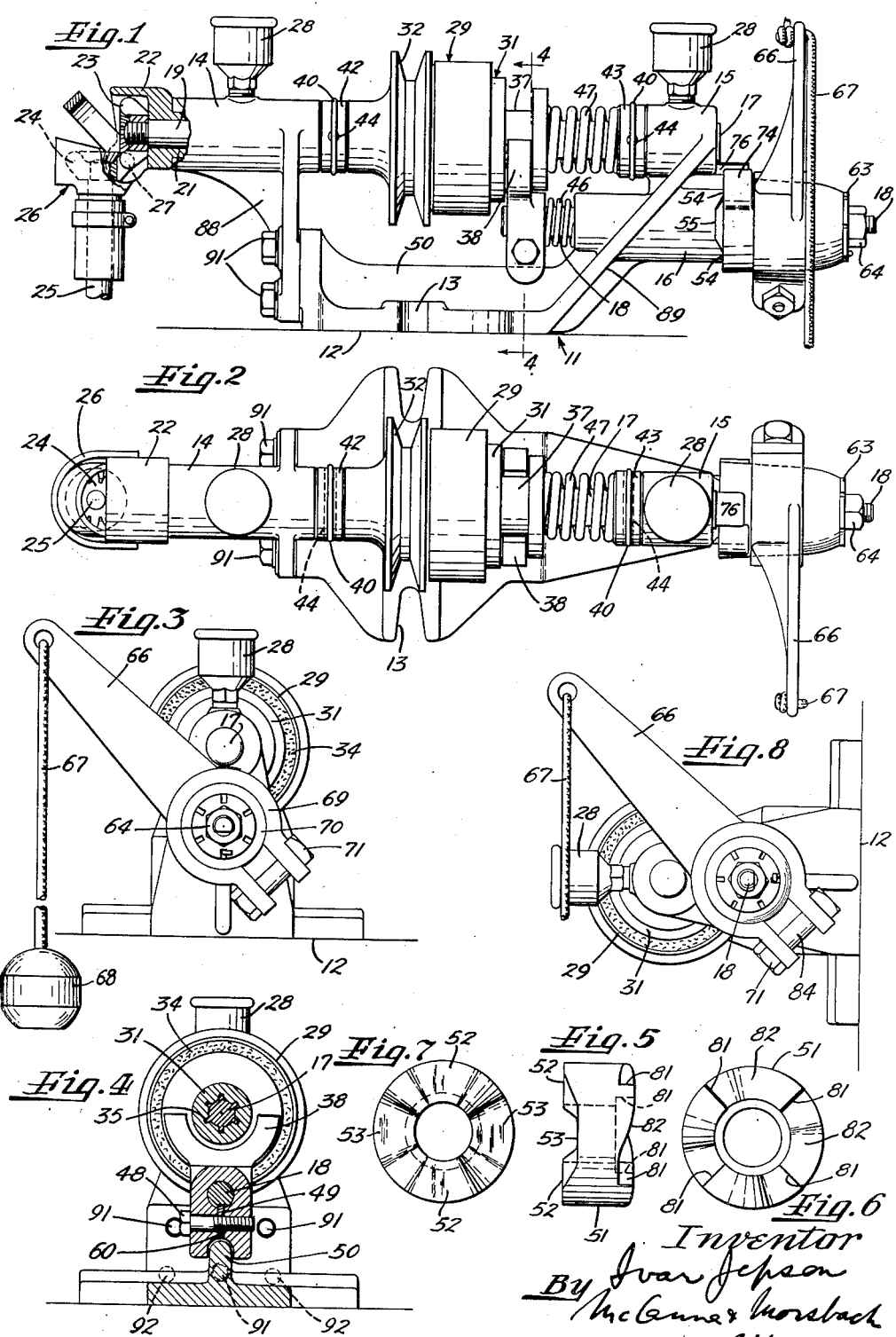
Inventor
Ivar Jepson
By McCanna & Morsbach
Attys.

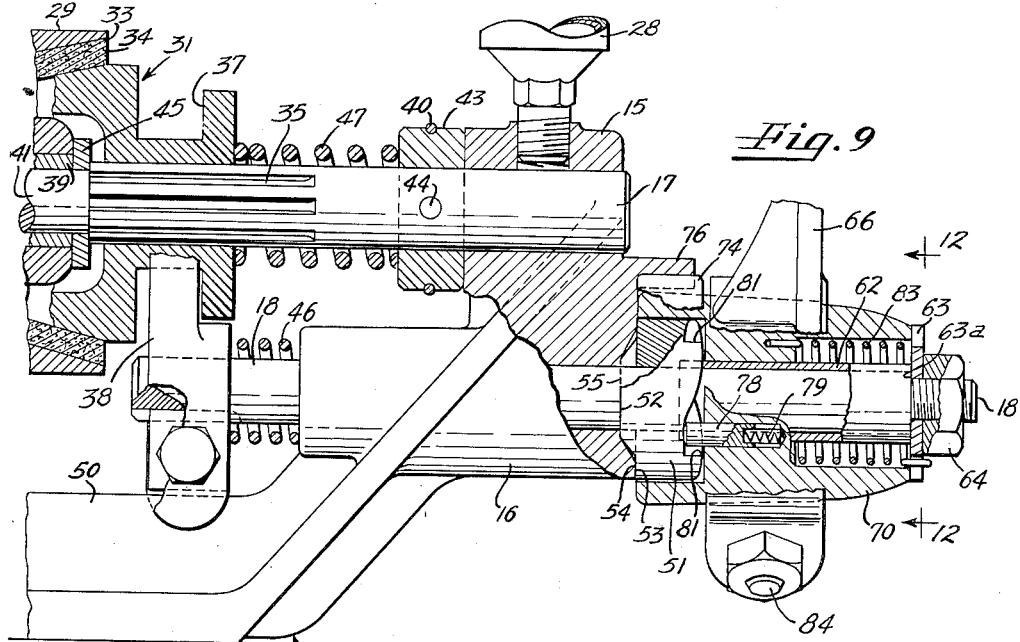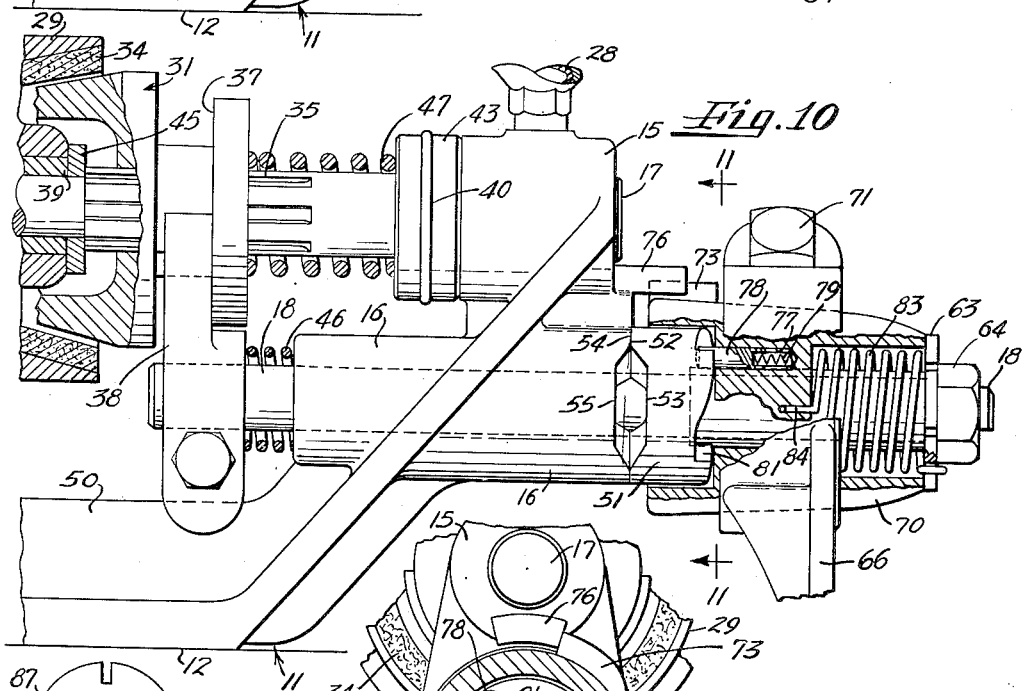

Patented Nov. 10, 1953

2,658,597

UNITED STATES PATENT OFFICE 2,658,597

CAM RELEASED CLUTCH

Ivar Jepson, Oak Park, Ill., assignor to Sunbeam Corporation, Chicago, Ill., a corporation of Illinois Application May 11, 1948, Serial No. 26,317

2 Claims. (Cl. 192—92)

This invention relates in general to power driven clutch and shifter assemblies and has more particular reference to devices of this kind adapted for different mountings. It relates particularly to improvements in the assembly disclosed in United States Patent No. 2,352,596.

An object of the invention is the provision in an assembly of the above character having a clutch with a first friction member movable into engagement with a second friction member of novel control means that is movable a preselected distance successively in the same direction for effecting engagement and disengagement of the friction members.

Another object of the invention is the provision in an assembly of the above character of novel means for returning the control means to a preselected position.

Another object of the invention is the provision in an assembly of the above character of novel control means that is adjustable to any of a plurality of angular positions.

Another object of the invention is the provision in an assembly of this kind which may be driven with an endless belt of means whereby the endless belt may be readily replaced without completely disassembling the unit.

Another object of the invention is to provide a mechanism of the character which is relatively inexpensive to manufacture, which is efficient, which is rugged, and which is reliable in service.

Other objects and attendant advantages will be appreciated by those skilled in this art as the invention becomes better understood by reference to the following description when considered in connection with the accompanying drawing, in which—

Figure 1 is a side elevation of a power driven clutch and shifter assembly, partly in vertical section, embodying the invention;

Fig. 2 is a plan view thereof;

Fig. 3 is an end view thereof looking at the right hand end of Figure 1 and showing a hand grip attached to the shifter cord;

Fig. 4 is a cross section taken substantially on the line 4—4 of Figure 1;

Fig. 5 is a side view of the shifter cam employed in the assembly shown in the previous views;

Fig. 6 is a front view of the shifter cam as seen from the right of Fig. 5;

Fig. 7 is a back view of the shifter cam as seen from the left of Fig. 5;

Fig. 8 is an end view of the mechanism mounted at an angle to the position shown in Fig. 3 and with the lever positioned to accommodate this mounting;

Fig. 9 is a fragmentary sectional view showing the assembly in the clutch-engaging position;

Fig. 10 is a view similar to Fig. 9 showing the assembly in de-clutched position;

Fig. 11 is a sectional view of Fig. 10 taken on the line 11—11, and

Fig. 12 is a sectional view of Fig. 9 taken along line 12—12.

Referring now more particularly to the drawings, the invention is shown embodied in a clutch and shifter assembly comprising a frame or bracket generally designated by 11 having a flat base bottom 12 adapted to seat against and be attached to a suitable support as by means of bolts (not shown) passing through apertures 13, and bearing housings 14, 15, and 16 in the arrangement shown. A drive shaft 17 is journaled in suitable bearings in the bearing housings 14 and 15 and a shaft 18 is supported in the bearing housing 16 for lengthwise movement therein for purposes of shifting components of the clutch assembly as will be presently described. In this case the shaft 17 is journaled directly in the bearing housing 15 which may be relatively short in length because of the lighter bearing load at this end of the shaft. The opposite or driving end of the shaft 17 has a reduced portion 19 journaled in a sleeve bearing 21 (see Figure 1) having a locating collar 22 at its outer end. This bearing is relatively long and is replaceable because of the heavier load in transmitting power from this end. Any suitable drive transmitting connection may be applied to this end of the drive shaft such, for example, as a universal joint including a gear 23 fixed to the drive shaft 17, a gear 24 fixed to a driven shaft 25 and a suitable yoke and trunnion housing structure 26 for maintaining the gears in driving connection while permitting movement of the driven shaft 25 to any angular position about the center 27, as well as the longitudinal axis of the drive shaft 17. In this case one of the trunnion yokes is integral with the bearing 21 and collar 22. Suitable means such as grease cups 28 are provided for lubricating the drive shaft 17 and associated bearings.

A clutch is mounted on the drive shaft between the bearing housings 14 and 15, preferably comprising a driving member 29 and a driven member 31. The member 29 has a V-groove 32 adapted to receive a V-belt driven from a suitable source of power and a cone socket 33 provided with a suitable frictional surface 34 of clutch lining material such as a cork composition. The member 31 is in the form of a cone slidably disposed for axial movement on the splined portion 35 (see Fig. 9) of the drive shaft and adapted to be frictionally engageable with the clutch lining 34. At its outer end the cone is formed with an annular groove 37 adapted to receive a shifter yoke 38 which is operable to effect engagement and dis-engagement of the cone 31 with clutch lining 34. The driving member 29 has spaced bushings 39 (see Fig. 9), only one of which is shown, pressed into opposite ends of a center bore thereof and journaled on the intermediate portion 41 of the drive shaft 17. The drive shaft is held against endwise displacement by thrust collars 42 and 43 on opposite sides of the clutch and mounted on the shaft by taper pins 44 extending through the collars and the shaft respectively. Each pin is held in place by a wire retaining ring 40. A spacing washer 45 is positioned on the drive shaft 17 adjacent the splined portion 35 for limiting axial movement of the driving member 29 to the right as seen in Fig. 9. A coil spring 47 mounted on the shaft 17 between the collar 43 and the cone 31 is under compression and acts to urge the cone 31 into frictional driving engagement with the clutch lining 34 of the driving member 29.

Movement of the cone 31 to engage the clutch lining 39 as well as movement in the opposite direction to disengage cone 31 from the clutch lining 34 is controlled by the shifter yoke 38 and the shifter shaft 18. As observed in Fig. 4 the shifter yoke 38 is fixedly clamped to the shifter shaft 18 by means of a clamping screw 48, the yoke 38 being split at its lower end at 49 to allow for this clamping action and also to permit the use of a key 60 between the yoke and the shaft 18. To guide and prevent rotative displacement of the yoke 38 the frame 11 is provided with an upstanding guide rib 50 disposed to be received between the spaced portions of the split lower end of the shifter yoke 38. In this embodiment of the invention the axial position of the shifter shaft 18 is under the control of suitable cam means. As shown the means includes a member 51 mounted for rotation about the shifter shaft 18 and having a pair of diametrically opposed raised portions 52 formed on one axial face with intermediate low portions 53. The respective raised and low portions are interconnected by smoothly inclined surfaces. Cooperating with these raised and low portions 52 and 53 respectively, in a manner to be described, are a pair of diametrically opposed raised portions 54 with intermediate low portions 55 formed on the bearing housing 16 adjacent the cam 51. The raised portions 54 and the low portions 55 are also interconnected by smoothly formed inclined surfaces. The respective raised and low portions of the cam 51 are coordinated with the raised and low portions on the bearing housing so that with the parts in the position shown in Fig. 9, in which the cone 31 frictionally engages the clutch lining 34, the raised portions 52 of the cam 51 are received in the low portions 55 on the bearing housing and the raised portions 54 on the bearing housing are received in the low portions 53 on the cam 51. When the cam 51 is rotated to the position shown in Fig. 10 the raised portions 52 of the cam engage the raised portions 54 on the bearing housing and the cam 51 is displaced axially from its position as shown in Fig. 9. In this position of the respective parts the cone 31 is disengaged from the clutch lining 34. The movement of the cam 51 is utilized to control the position of the cone 31 by means of the shifter shaft 18, the thrust sleeve 62 which encircles the shaft 18 and bears against the cam 51, and a thrust disc 63 held against a shoulder 63a, formed on the shaft 18, by a nut 64 threaded on the shaft. To prevent rotation of the thrust disc 63 the shaft 18 is formed with a flat surface 65 and the disc 63 is formed with a generally D-shaped opening (see Fig. 12) for receiving the shaft 18.

A lever 66 movable between preselected angular positions controls the relative position of the cam 51 with respect to the bearing housing 16 or the frame 11. At its free end the lever 66 may be provided with a pull cord 67 and a hand grip 68 for convenience in actuating the lever and at its opposite end the lever is formed with a split collar 69 arranged to be clamped about a shifter barrel 70 by a locking screw 71. It is to be understood that this construction is advantageous from the standpoint that the lever 66 may be adjusted to any angular position relative to the barrel 70. The barrel 70 is rotatably journaled about the thrust sleeve 62 and has at its inner end a pair of opposed stop lugs 73 and 74 for engagement with opposite sides of a frame lug 76 to limit rotation of the lever 66 in opposite directions. Internally of the barrel 70 is a pair of axially extending diametrically opposed recesses 77 containing pawl pins 78 urged toward the cam 51 by springs 79. The pawl pins 78 are engageable alternately with a pair of diametrically opposed shoulders 81 formed on the cam 51, on the axial face thereof opposite to the raised and low portions 52 and 53, respectively. For purposes of illustration four shoulders 81 equally spaced about the axial face of the cam 51 are provided. The pawls 78 are operable to rotate the cam 51 counterclockwise as viewed in Fig. 11 when the lever 66 and barrel 70 are rotated in a similar direction. Adjacent each shoulder 81 the axial face of the cam member 51 is inclined axially outwardly from the bottom of one shoulder to the top of the adjacent shoulder as shown at 82 so that when the lever is moved in the opposite direction the pawls are guided up the inclined surfaces from engagement with one pair of shoulders 81 to a position in which they are urged into engagement with another pair of shoulders 81 when the lever moves a preselected angular distance relative to the cam 51 in a clockwise direction. The arrangement of the pawls 78 and the shoulders 81 is in effect a ratchet construction.

Means is provided for urging the lever clockwise to a preselected position determined herein by engagement of the barrel stop lug 74 with the frame lug 76. In this embodiment the means comprises a torsion spring 83 which has one end anchored on the barrel 70 as by being deformed to project into a recess 84 formed in the barrel and the other end is anchored in one of the peripheral slots 87 in the thrust plate 63, the particular slot 87 depending on the torsion in the spring required in a given application.

Another important feature of the present invention is the provision of means in a clutch and shifter assembly driven by an endless V-belt of means whereby the endless belt may be readily replaced and serviced without completely disassembling the clutch and shifter assembly. For this purpose the frame is formed by a pair of arms 88 and 89 for carrying the drive shaft 17, the driving member 29 and the cone 31 and associated components. The frame arms 88 and 89 are formed separately and are attached together by screws 91 to form unitary frame 11. The arms may be alined by suitable dowels 92. To install the endless belt the gear 23 is removed from the drive shaft 17. Thereafter the screws 91 are removed and the arm 88 is moved axially away from the arm 89 far enough to permit passage of the belt between the arms 88 and 89.

Fig. 9 shows the component parts in their respective positions when the cone 31 engages the clutch lining 34. To disengage the cone 31 the lever 66 is rotated counterclockwise by pulling downwardly on the cord 67. This rotates the shifter barrel 70 in a counterclockwise direction as seen in Fig. 11. The pawl pins 78 rotatable with the barrel 70 engage a pair of shoulders 81 on the cam 51 and rotate the latter simultaneously with movement of the lever 66 causing the raised portions 52 on the cam 51 to move up the inclined surfaces between the raised and low portions 54 and 55 on the bearing housing 16 until the cam 51 is rotated 90 degrees and the raised portions 52 engage the raised portions 54 on the bearing housing 16. Movement of the lever is limited by engagement of lug 73 with lug 76 on the frame. In this position of the cam 51 the shifter shaft 18 is moved to its outermost axial position as shown in Fig. 10. Simultaneously the shifter yoke 38 is moved axially with the movement of the shaft 18 and moves the cone 31 axially against the action of the spring 47 to disengage the cone 31 from the clutch lining 34. With the parts in this position the driving member 29 is freely rotatable and does not transmit power to the driven shaft 25. When the pull cord 67 is released the shifter barrel 70 and lever 66 return to their normal position determined by stop lug 74 engaging the frame lug 76 under the influence of the torsion spring 83. During the return movement of the lever 66 the pawl pins 78 move relative to the cam 51 and pass over the inclined surfaces 82 so as to engage another pair of shoulders 81.

To re-engage the cone 31 with the clutch lining 34 the rope 67 is pulled downwardly again in the same manner as described in the preceding paragraph to rotate the lever 66 and the shifter barrel 70 counterclockwise to the position determined by engagement of the barrel lug 73 with the stop 76. During this movement the pawl pins 78 engage the next pair of shoulders 81 and rotate the cam 51 through another 90 degrees. During this movement the cam 51 is rotated relative to the bearing housing 16. At the end of this movement the raised portions 52 of the cam 51 are received in the low portions 55 of the bearing housing 16 and the raised portions 54 on the bearing housing 16 are disposed in the low portions 53 on the cam 51. The compression spring 46 acts to move the shifter shaft 18 and yoke to the left as shown in Fig. 9 and thus hold the cam member 51 in tight engagement with the bearing housing 16. The compression spring 47 disposed between the cone 31 and the thrust collar 43 urges the cone 31 into positive driving engagement with the clutch lining 34.

When it is desired to mount the drive mechanism in a different position such, for example, as the base portion 12 in a vertical plane, that is 90 degrees from its horizontal position, for attachment to the side of an upright supporting member, as shown in Fig. 8, the lock bolt 71 is released sufficiently to permit the lever 66 to be rotated relative to the barrel 70 to a position 90 degrees ahead in a clockwise direction with respect to the frame, to take care of the 90 degrees change in position of the frame so as to locate the shifter lever in the operative position as shown in Fig. 8. The lever is in the same operative position as occupied in Fig. 3 wherein the base portion of the frame is horizontal instead of vertical. Due to the fact that the lever 66 may be adjusted to any desired angular position it is to be understood that the base portion 12 of the frame 11 may be mounted upon a supporting member that is at any angle with respect to the horizontal position and the unit will be in an operative position as soon as the shifter lever 66 has been shifted to a position corresponding to the mounting of the frame 11.

It will be apparent from the foregoing that with the construction shown the frame may be mounted in an infinite number of angular positions which is particularly advantageous and desirable in order to accommodate the drive mechanism and shifter to any of a large variety of circumstances and conditions of use. For example, the embodiment here shown is designed as a power drive or so-called "drive gear" for animal shearing and clipping machines and particularly for sheep shearing machines. This mechanism constitutes a unit of assembly adapted to be mounted in any of a variety of positions to serve the needs of a sheep shearing drive gear. Overhead mountings either in a horizontal or a vertical position are shown herein but it will be manifest that the frame may be mounted so that the clutch side of the frame is positioned either at the right or left of the attachment base or above or below the same. The appropriate adjustment of the shifter lever is of course made for each particular mounting. It is to be manifest that this unit of assembly may be mounted either on a stationary structure or on a movable carrier as, for example, on a truck or on the rear end of a motor car so that it may be conveniently transported to the place of use. Also, any suitable source of power may be used as the prime mover as, for example, an electric motor, a gas engine, or a power line shaft. If desired, the driving member 29 may be provided with means other than the V-groove for the power transmitting connection.

It should be manifest that the present invention is not limited for use with animal shearing and clipping machines but is capable of general application as a drive and clutch shifter mechanism. Accordingly, various modifications may be made in the device embodying the present invention without departing from the spirit and scope of the appended claims.

I claim:

1. A shifter mechanism for a power driven clutch of the type having a frame and rotatable driving and driven elements movable relative to each other in an axial direction for clutching engagement and disengagement, said shifter mechanism comprising a shaft mounted on said frame for axial movement and connected to one of said elements for producing relative axial movement therebetween, said frame adjacent said shaft having high and low portions disposed coaxially of said shaft defining a fixed first cam means, lever means mounted on said shaft and movable between preselected positions, second cam means rotatably mounted on said shaft and engageable with said first cam means, ratchet means for drivingly relating said lever means and second cam means for only one direction of movement of said lever means to move said second cam means relative to said first cam means and to be disengaged by said lever means when the latter moves in the opposite direction, said second cam means in one position relative to the first cam means shifting said shaft axially to move said one element to a position in which it engages said other element and in the other position shifting said shaft axially to move said one element to a position in which it disengages the other member, and torsion spring means surrounding said shaft and connected between said lever means and said shaft for urging said lever means to a preselected one of its positions.

2. A shifter mechanism for a power driven clutch having interengaging friction members including a drive shaft for one of said members adapted to be driven by an external power source with the other of said friction members mounted for axial movement on said driven shaft, said shifter mechanism comprising a frame associated with said drive shaft and friction members adapted for attachment to a support, means operable to move said other of said friction members into and out of clutching engagement with said one friction member including a shifter rod mounted on said frame for axial movement relative thereto and connected to said other friction member, cam means rotatably mounted on said rod and engageable with cam means on said frame for controlling the axial position of said rod; lever means movable between preselected positions for controlling the cam means and having a recess defined therein, a disc rigidly mounted on said rod and having a plurality of peripherally extending slots formed thereon, and a torsion spring embracing said rod and having an end disposed in said recess and an end disposed in one of said peripheral slots and biased to return said lever means to one of its preselected positions.

IVAR JEPSON.

References Cited in the file of this patent

UNITED STATES PATENTS

| Number | Name | Date |
|---|---|---|
| 384,560 | Bugbee et al. | June 12, 1888 |
| 822,714 | Bartholomew | June 5, 1906 |
| 858,789 | Brachmann | July 2, 1907 |
| 904,619 | Kepple | Nov. 24, 1908 |
| 1,153,382 | Hale | Sept. 14, 1915 |
| 1,756,964 | Wilson | May 6, 1930 |
| 2,078,859 | Lapham | Apr. 27, 1937 |
| 2,256,987 | Meyerhoefer | Sept. 23, 1941 |
| 2,352,596 | Bartlett et al. | July 4, 1944 |
| 2,367,076 | Varblow | Jan. 9, 1945 |
| 2,423,043 | Olstad | June 24, 1947 |

FOREIGN PATENTS

| Number | Country | Date |
|---|---|---|
| 104,355 | Australia | June 23, 1938 |